United States Patent
Robertsson et al.

(10) Patent No.: US 6,317,964 B1
(45) Date of Patent: *Nov. 20, 2001

(54) WAVEGUIDE CONNECTOR

(75) Inventors: Mats Robertsson, Stockholm; Paul Eriksen, Tyresö; Kristian Engberg, Sollentuna; Peter Lo Curizo, Älvsjö, all of (SE)

(73) Assignee: Telefonaktiebolaget LM Ericsson (publ), Stockholm (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,463

(22) PCT Filed: Dec. 17, 1996

(86) PCT No.: PCT/SE96/01684

§ 371 Date: Sep. 18, 1998

§ 102(e) Date: Sep. 18, 1998

(87) PCT Pub. No.: WO97/22898

PCT Pub. Date: Jun. 26, 1997

(30) Foreign Application Priority Data

Dec. 19, 1995 (SE) .................................. 9504549

(51) Int. Cl.[7] .......................... H01Q 17/00; G02B 6/36
(52) U.S. Cl. ........................ 29/601; 29/600; 29/464; 385/65; 385/52; 385/83
(58) Field of Search .................. 29/601, 600, 748, 29/855, 840, 464, 468; 385/65, 52, 83

(56) References Cited

U.S. PATENT DOCUMENTS

| | | | |
|---|---|---|---|
| 3,048,913 | * 8/1962 | Ball | 29/600 |
| 3,986,255 | * 10/1976 | Mandal | 29/840 |
| 4,802,727 | * 2/1989 | Stanley | 385/89 |
| 4,867,532 | * 9/1989 | Stanley | 359/572 |
| 4,896,936 | * 1/1990 | Stanley | 385/14 |
| 4,899,257 | * 2/1990 | Yamamoto | 29/855 |
| 5,031,984 | * 7/1991 | Eide et al. | 385/15 |
| 5,297,219 | 3/1994 | Weldy. | |
| 5,416,868 | * 5/1995 | Kakii et al. | 385/65 |
| 5,422,974 | * 6/1995 | Brown et al. | 385/52 |
| 5,457,765 | * 10/1995 | Suzuki et al. | 385/65 |
| 5,577,320 | * 11/1996 | Shinohara et al. | 29/748 |
| 5,623,564 | * 4/1997 | Presby | 385/65 |
| 5,651,084 | * 7/1997 | Morlion et al. | 385/65 |

FOREIGN PATENT DOCUMENTS

| | | | |
|---|---|---|---|
| 0 466 134 | 1/1992 | (EP). | |
| 1-232307 | 9/1989 | (JP). | |
| 1-291204 | * 11/1989 | (JP) | 29/601 |
| 86/02172 | 4/1986 | (WO). | |
| 87/02518 | 4/1987 | (WO). | |
| 93/15424 | 8/1993 | (WO). | |

* cited by examiner

*Primary Examiner*—Lee Young
*Assistant Examiner*—A. Dexter Tugbang
(74) *Attorney, Agent, or Firm*—Burns, Doane, Swecker & Mathis, L.L.P.

(57) ABSTRACT

A method and arrangement for aligning a waveguide connector to at least one optical device is set forth. The arrangement includes a waveguide connector and a substrate carrying at least one waveguide. The waveguide connector having both guide legs and aligning elements. The method includes the step of shaking the arrangement at a frequency and amplitude sufficient to cause opposing aligning elements disposed on the waveguide connector and on the substrate to engage each other.

10 Claims, 4 Drawing Sheets

WAVEGUIDE CONNECTOR

FIELD OF INVENTION

The present invention relates to a method and to a device for aligning and mechanically connecting at least one substrate-mounted waveguide to at least one optical device.

DESCRIPTION OF THE PRIOR ART

The task of leading light from and into optical waveguides that are disposed on a rigid or on a flexible substrate is beset with difficulties. One difficulty resides, for instance, in connecting an optical device to the waveguides in a simple and inexpensive manner. A high degree of precision is required in connecting an end surface of the optical device to the waveguides.

JP 1-232 307 describes a device for connecting optical waveguides to optical fibres. In this case, the waveguide and fibre are mutually connected with the aid of two components that are pushed one into the other. The waveguides are seated firmly in one of said devices and the fibres firmly seated in the other device. The mutually facing end surfaces of the fibres and waveguide are aligned with one another by virtue of the fact that guide holes provided in one device and receiving guide pins on the corresponding device are slightly larger than the guide pins themselves. The resultant play is used to bring the surfaces into mutual alignment, such as to achieve the least possible attenuation of the optical signal. However, this solution presumes that the waveguides are manufactured integrally with the connector. In other words, waveguides that are disposed on a flat substrate cannot be connected with optical fibres by means of this known technique.

SUMMARY OF THE INVENTION

There is a great need of enabling light to be led into and out of optical waveguides that are disposed on a flat substrate. In order light to be led into and out of waveguides, the waveguides are mutually connected with the aid of optical devices. The splice or joint between the optical waveguides and the optical device is a very sensitive part. The smallest error in alignment, angle between the waveguides and the optical device or gap therebetween will result in considerable impairment of the intensity of the light.

Much of the problem experienced in connecting together waveguides and optical fibres is comprised of aligning respective fibres and waveguides in relation to one another and in obtaining a "tight" interface therebetween. Alignment can be achieved actively, i.e. by determining the optimal point of alignment with the aid of optical equipment.

The intention of the present invention is to solve the aforesaid problems, by bringing a waveguide connector that includes aligning elements into alignment with the substrate-mounted optical waveguides. The aligning elements on the waveguide connector fit into corresponding aligning elements on the substrate. An optical device having an MT interface may be connected to the waveguide connector.

The waveguide connector may also include guide legs, which may be adapted to fit into recesses or apertures provided in the substrate in the vicinity of the waveguides. The waveguides may alternatively by disposed on a tongue, such that said guide legs will surround the tongue. The elements which function to align the waveguide connector in relation to the waveguides with respect to the six degrees of freedom (three co-ordinates and three angles) may be conical or spherical in shape, for instance. Corresponding aligning elements on the substrate may be inverse to the aligning elements on the waveguide connector. However, this is not a requirement of the invention, since the only criterion to be fulfilled is that the aligning elements shall fit into one another and provide satisfactory alignment of the waveguide connector on the substrate.

The mechanical aligning elements can be caused to fit together by shaking. After the waveguide connector has been placed on the substrate, the waveguide connector is shaken into position such that the substrate-mounted aligning elements and the waveguide connector will mesh with one another. The guide legs function to situate the waveguide connector in the proximity of the aligning elements. The guide legs prevent this shaking motion disturbing the position of the waveguide connector.

The object of the present invention is to simplify the connection of substrate-carried optical waveguides to optical devices. One advantage afforded by the present invention is that alignment of the waveguide connector on the substrate can be effected passively.

Another advantage is that the waveguide connector can be placed on the substrate with the aid of a vertical movement. This enables a pick-and-place robot to be programmed to place the waveguide connector on the substrate, which in turn enables the entire process of placing, aligning and affixing the waveguide connector on the substrate to be automated.

DETAILED DESCRIPTION OF PREFERRED EMBODIMENTS

Figure 1:
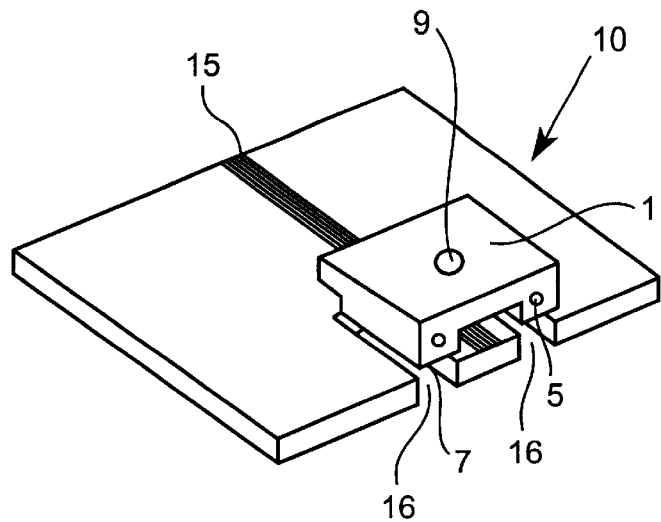
FIG. 1 is a perspective view of an inventive waveguide connector and waveguides disposed on a substrate.
Figure 6:
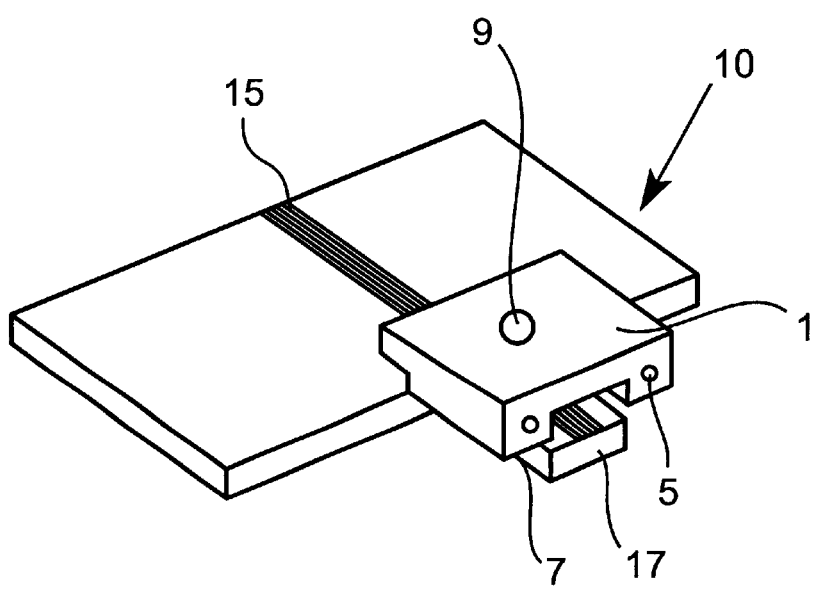
FIG. 6 is a perspective view of an inventive waveguide connector and waveguide disposed on a tongue substrate.

FIG. 1 illustrates an exemplifying embodiment of a waveguide connector 1 having a plurality of waveguides 15 disposed on a substrate 10. The waveguide connector 1 is U-shaped in this embodiment. The two depending guide legs 7 on the waveguide connector 1 fit into two apertures or slots 16 in the substrate 10. The waveguides 15 are situated on the substrate surface between the guide legs 7. As shown in FIG. 6, the guide legs may alternatively be placed over a tongue 17 that carries waveguides 15.

Figure 2:
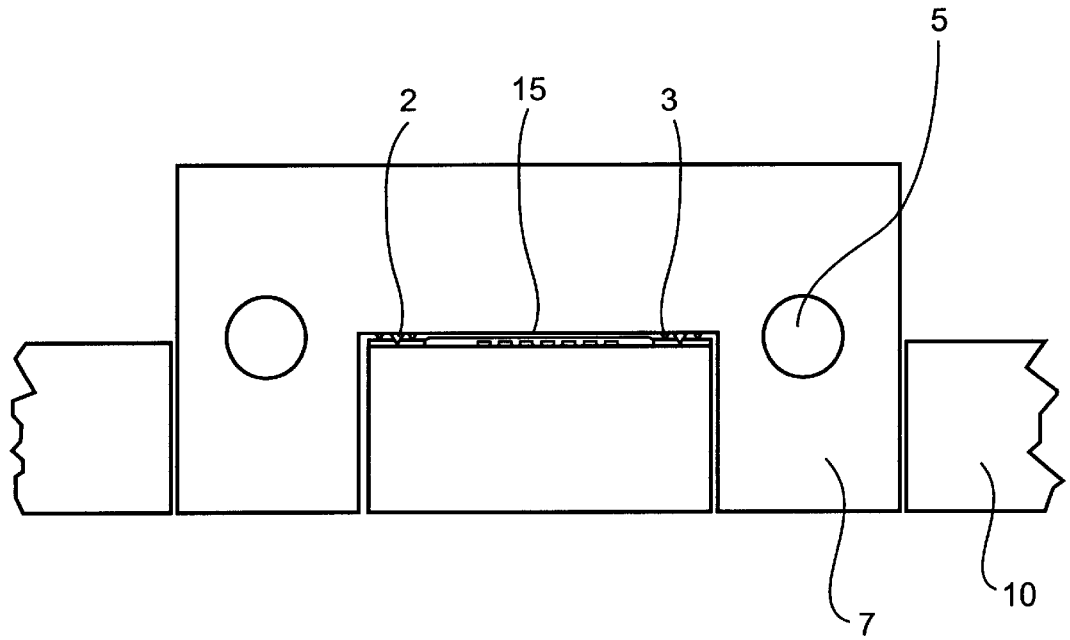
FIG. 2 illustrates the waveguide connector and the waveguide carrying substrate in FIG. 1 from the contact side.
Figure 3:
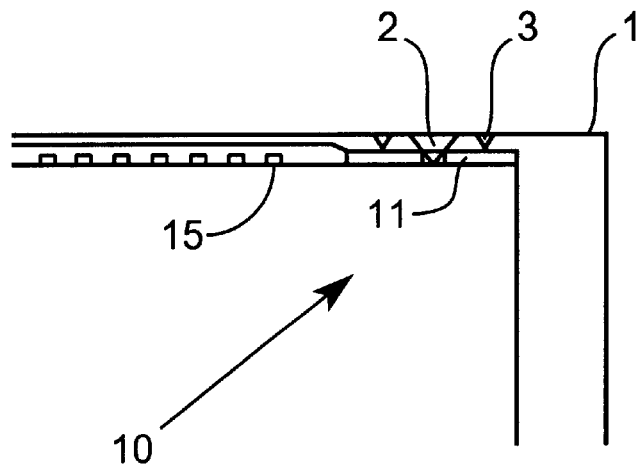
FIG. 3 is an enlarged view of the aligning elements on the waveguide connector and the substrate of FIG. 1.
Figure 4:
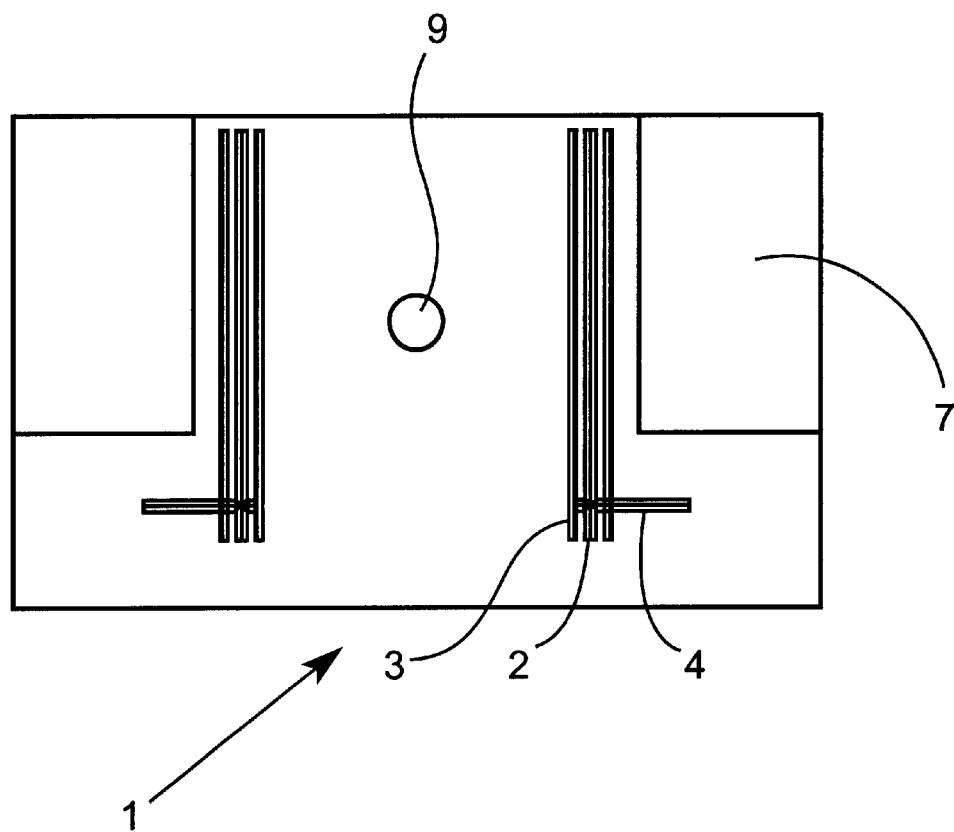
FIG. 4 illustrates the waveguide connector of FIG. 1 from beneath.

Aligning elements 2, 4 for aligning the waveguide connector 1 in relation to the substrate-carried waveguides 15 are provided between the two guide legs 7 of the waveguide connector 1. As indicated in FIG. 2, part of these aligning elements may be situated between the waveguides 15 and the substrate apertures 16 in which the guide legs 7 of the U-shaped waveguide connector 1 are received. The aligning elements 2, 4 may be conical or spherical in shape or may have the form of V-grooves; see FIGS. 3 and 4. When the aligning elements on the waveguide connector have the form of grooves, spheres or pyramids, the substrate-carried aligning elements may be the inverse of the grooves, spheres or pyramids, that is to say may have the form of grooves, spherical pits or inwardly extending pyramids. For instance, if the aligning elements on the waveguide connector are pyramidal in shape, the substrate-carried aligning elements may also have the form of a rectangular recess. In this latter respect, the sole requirement that need be fulfilled is that the edges or the sides of the pyramid lie in abutment with the edges of the rectangular recess so as to achieve stability in both the x-direction and y-direction. The aligning elements 2, 4 are also able to contribute towards alignment in the z-direction, although alignment in this direction is achieved mainly through the medium of supports 3 as described in more detail below.

Figure 7A:
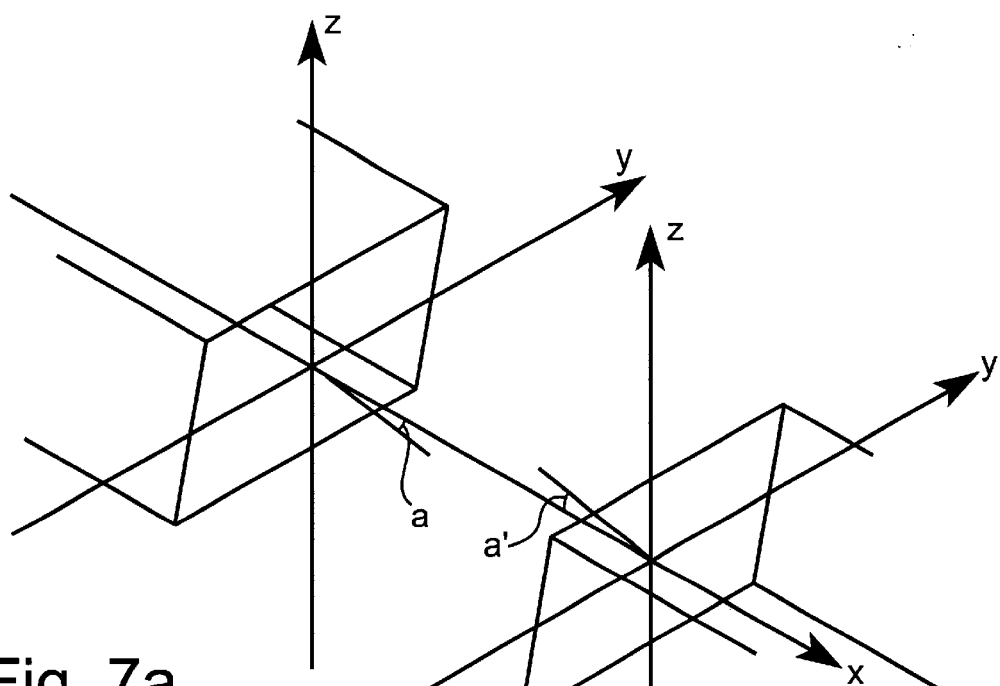
FIG. 7a is an exemplified perspetive view of two adapted and inclined contact surfaces.
Figure 7B:
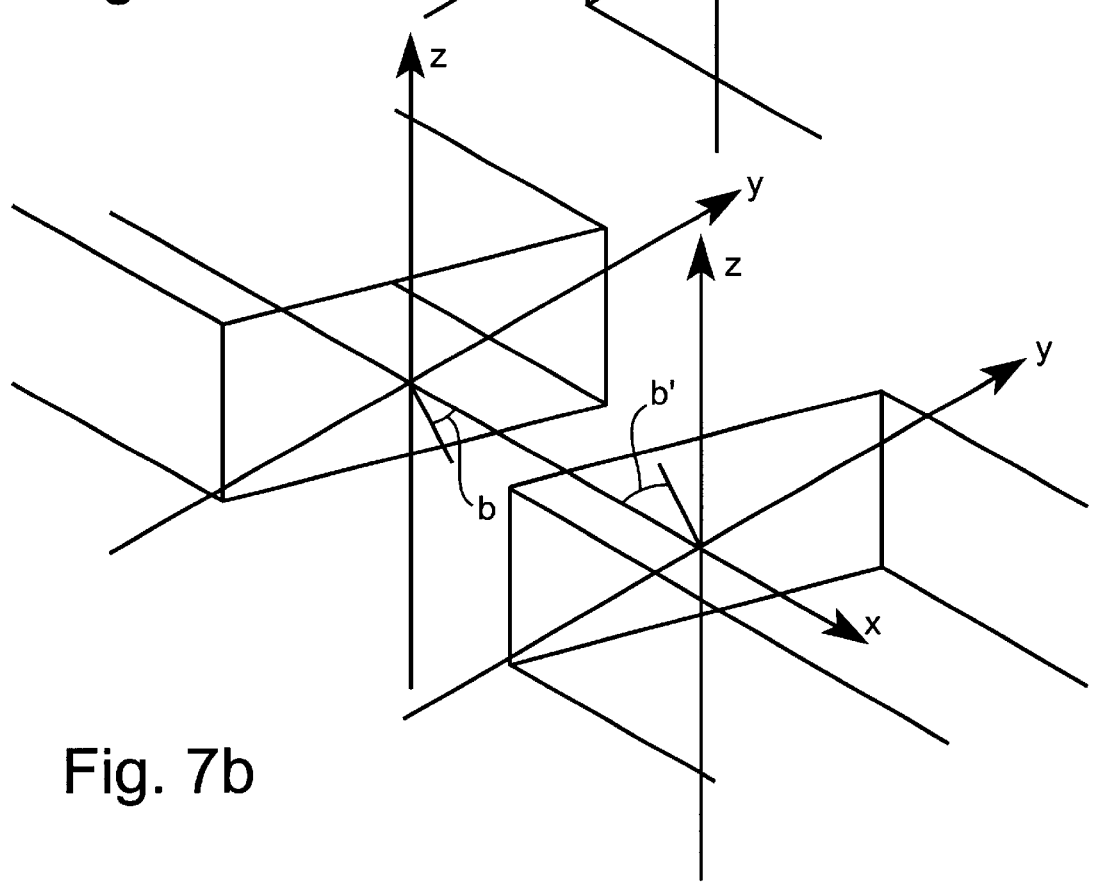
FIG. 7b is another exemplified perspective view of two adapted and inclined contact surfaces.

The aligning elements are disposed so that a normal to the MT-interface of the waveguide connector 1 will define two angles a and b in relation to the optical axis of the waveguide, see FIG. 7a and FIG. 7b. Angle a corresponds to an angle in the X-Z plane between said normal and said optical axis. Angle b corresponds to an angle in the X-Y plane between said normal and said optical axis. The MT interface of the optical device defines the coplementary angles a' and b' in relation to the angles a and b. In this case complementary refers to for example when angle a adopt a value q, the corresponding complemetary angle a' will adopt a value -q, where $0 \leq q \leq 360°$. When the waveguide connector and the optical device are brought together, they will be in alignment with one another. These criteria concerning the angles of the two contact surfaces are instrumental in ensuring that the surfaces will fit together equally as well as any element that has been cut-off in a single cut. In order to eliminate backward reflection of the optical signal in the joint between the two component parts, at least one of the angles a or b will be an angle different to 0°. This obliqueness of the contact surfaces in relation to one another mean that the signal will not be reflected backwards but will bounce out at the periphery.

A part of the aligning elements ensure that the waveguide connector is positioned correctly in the x-direction, whereas another part ensure that the waveguide connector 1 is positioned correctly in the y-direction.

The aligning elements may be situated anywhere on the surface of the waveguide connector that will enable contact with the substrate to be achieved, and vice versa. The aligning elements are preferably placed by the side of the waveguides, although there is nothing to prevent the aligning elements being placed between said waveguides.

Figure 5:
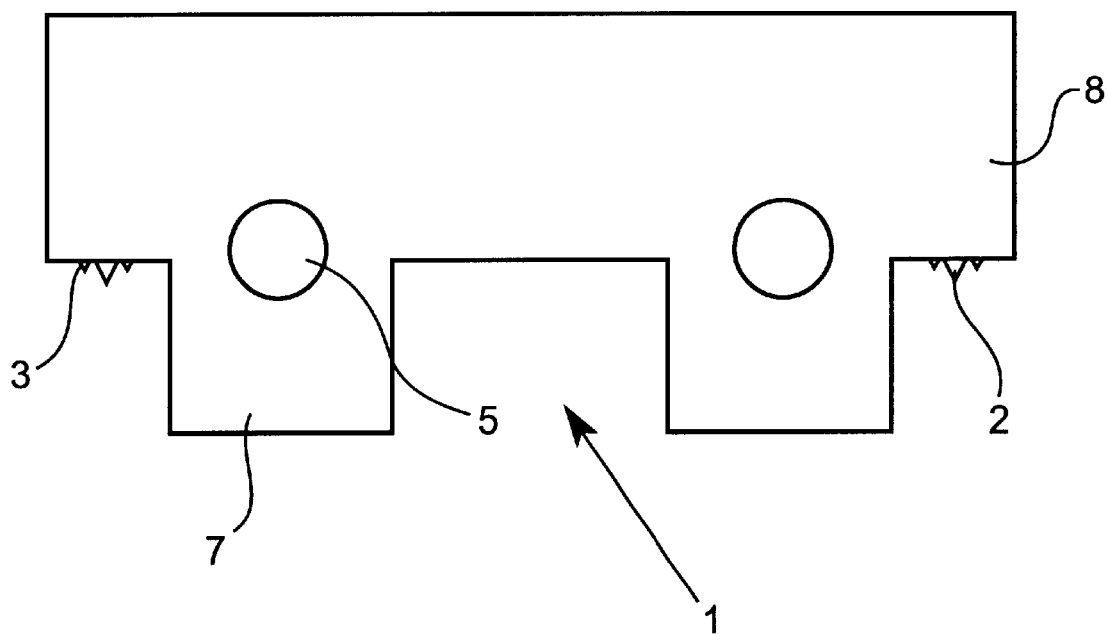
FIG. 5 illustrates an alternative embodiment of the waveguide connector.

FIG. 5 illustrates an alternative embodiment of the waveguide connector which is additionally flanged at 8 on respective sides thereof. The aligning elements may be placed on these additional flanges.

Thus, the waveguide connector carries aligning elements that mesh or engage with corresponding aligning elements on the substrate. These aligning elements may be comprised of a polymeric material or a ceramic material. With the intention of preventing damage to the substrate-carried aligning elements as the waveguide connector is fitted, additional supports 3 may be provided by the side of the aligning elements 2. The supports 3 function to prevent cracks from forming in the groove-shaped, substrate-carried aligning elements 2 as the aligning elements on the waveguide connector are shaken into meshing engagement with the substrate-carried aligning elements. However, the main function of the supports 3 is to ensure that the waveguide connector 1 will be positioned correctly in the z-direction. When the surface with which all supports 3 abut is situated at the same height, the supports are given, in manufacture, the same length in relation to a flat surface on the waveguide connector so as to align the waveguide connector in the z-direction. However, lack of space may make it necessary to position certain supports at substrate locations whose height differ from other abutment points. This need not present a problem, however, when this height difference is known. It is then possible to adapt the height of precisely this support in relation to said difference so that the waveguide connector will be positioned correctly in the z-direction nevertheless.

In order to ensure that the MT-device will connect well with the waveguide connector 1, it may be necessary to cut the outer end of the waveguide connector and the substrate and then polish the cut surfaces so as to obtain a smooth surface of appropriate shape. The waveguide connector includes guide holes 5 intended for the MT-device, for instance.

It is also conceivable that the aligning elements will be spherical in shape. The waveguide connector is either provided with spherical recesses or projections and the substrate provided with corresponding recesses or projections. As with the earlier mentioned case, precise correspondence between the respective shapes of the aligning elements is not a requirement of the invention. As before mentioned, the main criterion in this regard is that the aligning elements fit into one another and provide stability in the x-direction and y-direction and contribute towards alignment in the z-direction.

The waveguide connector may be extruded in material standard for plastic encapsulation or by injection-moulding from some suitable material.

After having been placed on the substrate, the waveguide connector can be affixed thereto in a number of different ways. One conceivable method is to provide the waveguide connector with a hole 9 and to inject glue on top of the waveguides through the hole, for instance. There is located between the waveguide connector and the substrate-carried waveguides an interspace which can be filled with glue through the hole in the waveguide connector, and therewith affix the waveguide connector to the substrate.

One method of placing the waveguide connector in the place intended on the substrate can be achieved with the aid of a pick-and-place robot programmed to grip the waveguide connector in a box and then move the waveguide connector to the substrate and finally place the guide legs on said device into the apertures provided herefor in the substrate, or over a tongue. The substrate, in turn, lies on a vibrator or shaker which is set into motion subsequent to the waveguide connector having been positioned. This shaking motion ensures that the aligning elements on the waveguide connector and the substrate will mesh with or engage in one another. The frequency and amplitude of this shaking motion is well-adapted to the size of the aligning elements. However, the waveguide connector will never be moved out of position entirely, because its guide legs embrace a number of tongues or extend down into the substrate apertures.

What is claimed is:

1. An arrangement for connecting and aligning at least one waveguide and at least one optical device in an x-direction, a y-direction and a z-direction, the x-direction being parallel to the at least one waveguide, the y-direction being in the same plane with the normal to the x-direction, and the z-direction being normal to both the x-direction and the y-direction, the arrangement comprising:

at least one waveguide connector comprising aligning elements, and supports disposed adjacent to the aligning elements;

at least one substrate comprising aligning elements disposed on the substrate, and the at least one waveguide disposed on the substrate; and wherein the waveguide connector aligning elements fit into the corresponding aligning elements disposed on the substrate thereby preventing movement of the waveguide connector relative to the substrate in the x- and y-directions, and wherein the supports engage the substrate in a manner to align the waveguide connector in the z-direction.

2. The arrangement according to claim 1 wherein the waveguide connector includes at least one guide leg; and the substrate includes at least one aperture adapted to receive the at least one guide leg.

3. The arrangement according to claim 1, wherein the waveguide connector includes at least two guide legs; and the substrate includes at least one tongue which is adapted to mate with the guide legs on the waveguide connector.

4. The arrangement according to claim 1, wherein the aligning elements on the waveguide connector and on the substrate are situated in positions in which they can contact one another.

5. The arrangement according to claim 1, wherein the waveguide connector includes guide holes.

6. The arrangement according to claim 1, wherein the waveguide connector includes at least one through hole above the waveguides.

7. The arrangement of claim 1, wherein the at least one waveguide connector further comprises guide legs, and the waveguide connector aligning elements are disposed between the guide legs.

8. A method of aligning and physically connecting at least one substrate carrying a waveguide and at least one waveguide connector in at least an x-direction and a y-direction, the x-direction being parallel to the waveguide and in the same plane with and normal to the y-direction, the substrate and the waveguide connector each having corresponding aligning elements, the method comprising the steps of:

placing the waveguide connector adjacent a plurality of substrate-carried waveguides; and shaking the substrate at a frequency and amplitude which causes the aligning elements on the waveguide connector and corresponding aligning elements on the substrate to engage in one another thereby insuring alignment of the waveguide connector in both the x-direction and the y-direction.

9. The method of claim 8, further comprising aligning the waveguide connector in a z-direction, the z-direction being normal to both the x-direction and the y-direction, wherein the method comprises providing the waveguide connector with supports that engage the substrate in a manner to insure alignment of the waveguide connector in the z-direction.

10. The method of claim 8, further comprising placing the waveguide connector adjacent to the plurality of substrate-carried waveguides with a robot, and wherein the shaking step is performed by a machine.

\* \* \* \* \*